United States Patent [19]

Mizuta et al.

[11] Patent Number: 4,689,537
[45] Date of Patent: Aug. 25, 1987

[54] DRIVING POSITION CONTROL SYSTEM FOR AUTOMOBILES

[75] Inventors: Ken Mizuta, Miyagi; Shiro Kondo, Furukawa, both of Japan

[73] Assignee: Alps Electric Co., Ltd., Japan

[21] Appl. No.: 843,182

[22] Filed: Mar. 24, 1986

[30] Foreign Application Priority Data

Mar. 23, 1985 [JP] Japan .................. 60-41024[U]

[51] Int. Cl.$^4$ ............................................. G05D 3/12
[52] U.S. Cl. ................................ 318/568; 318/603; 318/466
[58] Field of Search ................. 318/568, 603, 466

[56] References Cited

U.S. PATENT DOCUMENTS

| | | | |
|---|---|---|---|
| 4,128,797 | 12/1972 | Murata | 318/666 |
| 4,401,928 | 8/1983 | Kamijo et al. | 318/466 |
| 4,463,426 | 7/1984 | Caddick et al. | 364/424 |
| 4,467,252 | 8/1984 | Takeda et al. | 318/603 |
| 4,510,426 | 4/1985 | Michaels et al. | 318/565 |
| 4,523,136 | 6/1985 | Dudeck et al. | 318/568 |

Primary Examiner—William M. Shoop, Jr.
Assistant Examiner—Saul M. Bergmann
Attorney, Agent, or Firm—Guy W. Shoup

[57] ABSTRACT

An automatic seat adjustment system for the driver's seat of an automobile has a memory for storing the preferred seating positions of individual drivers and a control until for adjusting the seat from an arbitrary seating position to the preferred position at the touch of a button.

8 Claims, 8 Drawing Figures

DRIVING POSITION CONTROL SYSTEM FOR AUTOMOBILES

BACKGROUND OF THE INVENTION

1. Field of the Invention

The present invention relates to an automotive vehicle and, more particularly, to a position control system for an automobile seat, which automatically adjusts the driver's seat in accordance with the individual preferences of the user.

2. Description of the Prior Art

The automotive driver's seat is optimally positioned in accordance with the body shape, posture, driving habits and so on of each person driving it. A single automobile may be driven by a plurality of drivers belonging to a family, business, organization, etc. If optimum positioning is desired, it is necessary to adjust the position of the driver's seat and mirrors each time a new driver uses the automobile. If on the other hand, the position of the driver's seat is left unchanged, driving in an unnatural position will make the driver extremely exhausted and create an unsafe driving condition. Changing the seating position manually requires experimentation each time until the optimum position is found and this is time consuming.

SUMMARY OF THE INVENTION

The present invention has been conceived in view of the problems described above and its object is to provide an automatic position control system for an automobile seat, which can adjust the position of the seat to an optimum position according to the individual preferences of each user with the touch of a single button.

In order to achieve the above-specified object, according to the present invention, there is provided an automatic position control system for an automobile seat, which comprises a power seat having position adjusting means for adjusting the seating position of the seat in response to control signals from a control unit, a memory unit for storing data representing respective preferred positions for each one of a predetermined set of users; detecting means for detecting the position of the seat and supplying seat position data to the control unit, which at the touch of an activation button, compares the seat position as measured by the detecting means with the preferred position stored in the memory unit and outputs a control signal to the seat position adjusting means so that the seat will be adjusted to the preferred position of each user.

BRIEF DESCRIPTION OF THE DRAWINGS

Other objects, features and advantages of the present invention will become apparent from the following description to be made with reference to the accompanying drawings, in which.

DESCRIPTION OF THE PREFERRED EMBODIMENT

The present invention will be described in detail in connection with the preferred embodiment thereof with reference to the accompanying drawings.

Figure 1:
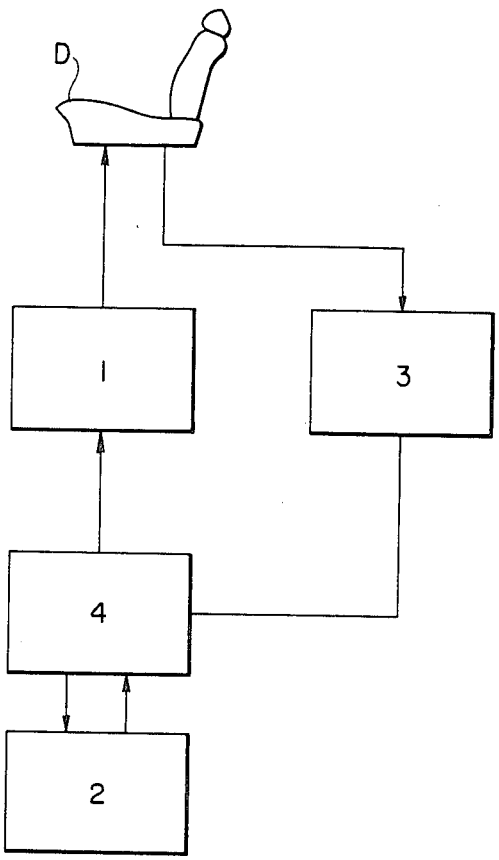
FIG. 1 is a block diagram showing one basic structure of a position control system for an automobile seat according to the present invention.

FIG. 1 is a block diagram of one implementation of the invention, in which a driver's seat D is provided with position adjusting means 1 for adjusting its seating position (i.e., distance from the steering column and inclination of the back support). Position detecting means 3 are connected to the seat D for measuring the actual position of the seat. A memory unit 2 stores a set of data representing the preferred seating position of a predetermined plurality of users. A control unit 4, at the touch of an activation switch 61 on an operating console, compares the actual position against a preferred position in memory and outputs a control signal to the adjusting means 1 to adjust the seat to the preferred position.

Figure 2:
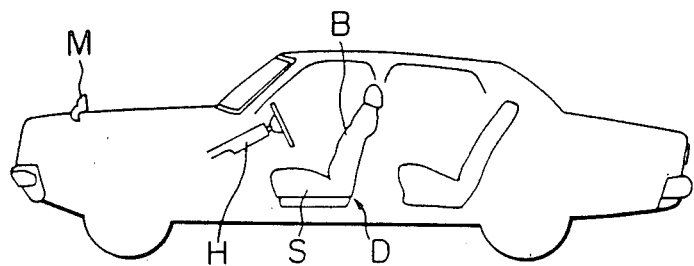
FIG. 2 is a schematic view showing the overall structure of an automobile.

Incidentally, the present embodiment will be described, as shown in FIG. 2, with a construction in which not only the position of a driver's seat, but also the angle of a rear-view mirror M can be adjusted and the position adjustment of the driver's seat D can be effected not only in the longitudinal directions, i.e., toward and away from a steering handle H, but also in the reclining angle, i.e., the angle of inclination of a seat back B with respect to a seat bottom portion S.

Figure 3:
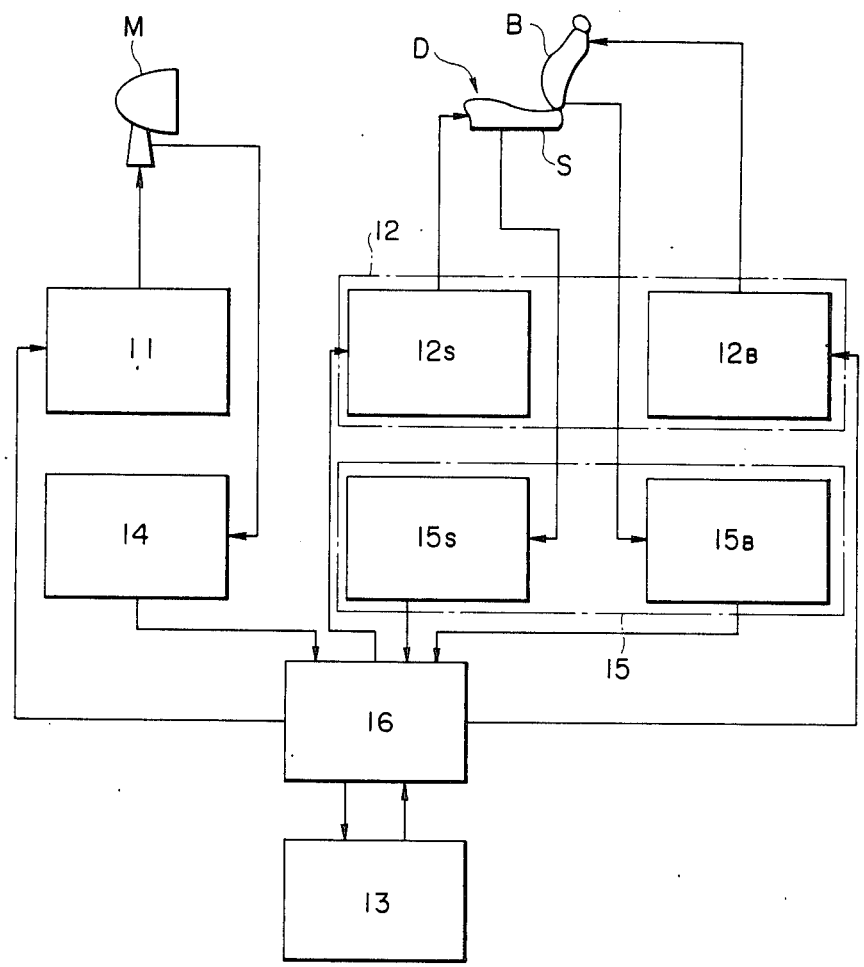
FIG. 3 is a block diagram showing the structure of a position control system including the basic structure of FIG. 1.

Thus, the preferred embodiment adopts a structure as shown in FIG. 3 to control the driver's mirrors M in addition to the aforementioned fundamental arrangement of FIG. 1.

As shown in FIG. 3, more specifically, the automobile is equipped with mirror angle adjusting means 11 for adjusting the angle of the rear-view mirror M in response to control signals from a control unit 16, and driver's seat position adjusting means 12 for adjusting the position of the driver's seat D. This driver's seat position adjusting means 12 is composed of longitudinal adjusting means $12_S$ for adjusting the longitudinal position of the driver's seat D, and inclination adjusting means $12_B$ for adjusting the angle of inclination of the seat back support B. Moreover, data representing the preferred angles of the rear-view mirror M and the preferred positions of the driver's seat D for individual drivers is stored in a memory unit 13. In this case, the preferred driving positions stored in the memory unit 13 contain not only the preferred positions for driving in the forward direction, but also ones for driving in reverse such as when parking the automobile. In order to detect the angular position of the rear-view mirror and the position of the driver's seat D, detecting means 14 and 15 are respectively provided, the latter of which is composed of longitudinal detecting means $15_S$ for detecting the longitudinal position of the driver's seat D, and inclination detecting means $15_B$ for detecting the angle of inclination of the seat back support B. For processing the detected signals coming from the aforementioned respective detecting means 14, $15_S$ and $15_B$, moreover, there is provided a control unit 16 for comparing the detected positions with the preferred driving positions stored in the memory unit 13 and this control unit 16 outputs control signals to the mirror angle adjusting means 11 and seat position adjusting means 12 based on its comparison, to thereby adjust the rear-view mirror M and the driver's seat D to the preferred angles and positions of the individual drivers.

Figure 4:
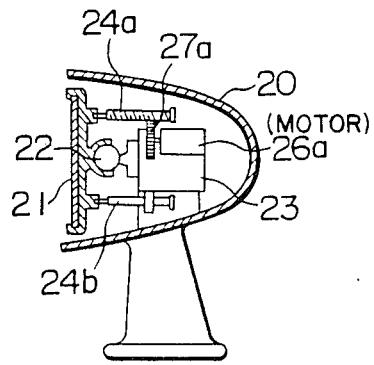
FIGS. 4 and 5 are longitudinal and transverse sections showing the structure of one mirror angle adjusting means.
Figure 5:
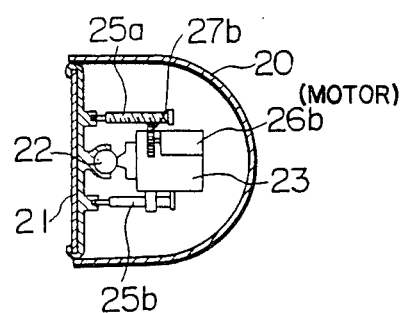

The mirror angle adjusting means 11 used in the preferred embodiment has, as shown in FIGS. 4 and 5, a mirror body 21 arranged at the open end of a mirror casing 20 with its back supported at its central position by a support member 23 disposed in the mirror casing 20 through a spherical joint 22 so it can be tilted in an arbitrary direction. To the mirror body 21, there are attached through respective spherical joints a first pair of operation levers 24a and 24b for tiltng the mirror vertically, and a second pair of operation levers 25a and 25b for tilting the mirror transversally, which in turn are so supported on the support member 23 they can slide in their respective axial directions. Moreover, operation levers 24a and 25a of the respective vertical and transverse pairs have their outer circumferences threaded to mesh with gears 27a and 27b, respectively, which are attached to the respective electric motors 26a and 26b, so that the mirror body 21 can be vertically inclined, when the operation lever 24a is driven back and forth, and transversely inclined, when the operation lever 25a is driven back and forth, by suitably driving the electric motors 26a and 26b. If these operations are combined, the mirror body 21 can be inclined in an arbitrary direction around the spherical joint 22.

Figure 6:
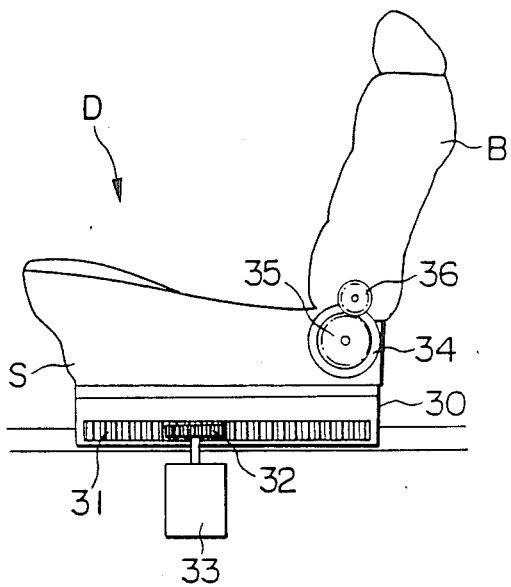
FIG. 6 is a side elevation showing the construction of a seat position adjusting means.

Next, the driver's seat position adjusting means 12 for adjusting the position of the driver's seat D can be made to have the construction shown in FIG. 6, for example.

Specifically, the seat portion S of the driver's seat D is mounted on a slide truck 30, to which a rack 31 is attached. An electric motor 33 is fixed to the automobile body and it has a pinion 32 which is in meshing engagement with the rack 31 so that the seat portion S can be moved in the longitudinal directions, i.e., toward and away from the steering handle H by energizing the electric motor 33. Thus, the longitudinal seat position adjusting means $12_S$ is able to respond to control signals from the control unit. On the other hand, the adjusting means $12_B$ for adjusting the angle of inclination, i.e., the reclining angle of the seat back-support B is composed of an electric motor 34, a gear 35 attached to the output shaft of the electric motor 34, and a gear 36 which is attached to the seat back B while being in meshing engagement with the former gear 35.

The detecting means 14, $15_S$ and $15_B$ for detecting the angle of the rear-view mirror M, and the position of the driver's seat D are preferably constructed in the following manner. Specifically, the detecting means is attached to the mirror angle adjusting means 11 and composed of encoders for detecting the angles of rotation of the gears 27a and 27b, and photosensors for detecting the sliding positions of the operation levers 24a, 24b, 25a and 25b. Moreover, the detecting means $15_S$ is attached to the longitudinal seat position adjusting means $12_S$ is suitably composed of a photosensor for detecting the displacement of the slide truck 30, whereas the detecting means $15_B$ of the seat back angle adjusting means $12_B$ can be composed of an encoder for detecting the angle of rotation of the gear 35.

Figure 7:
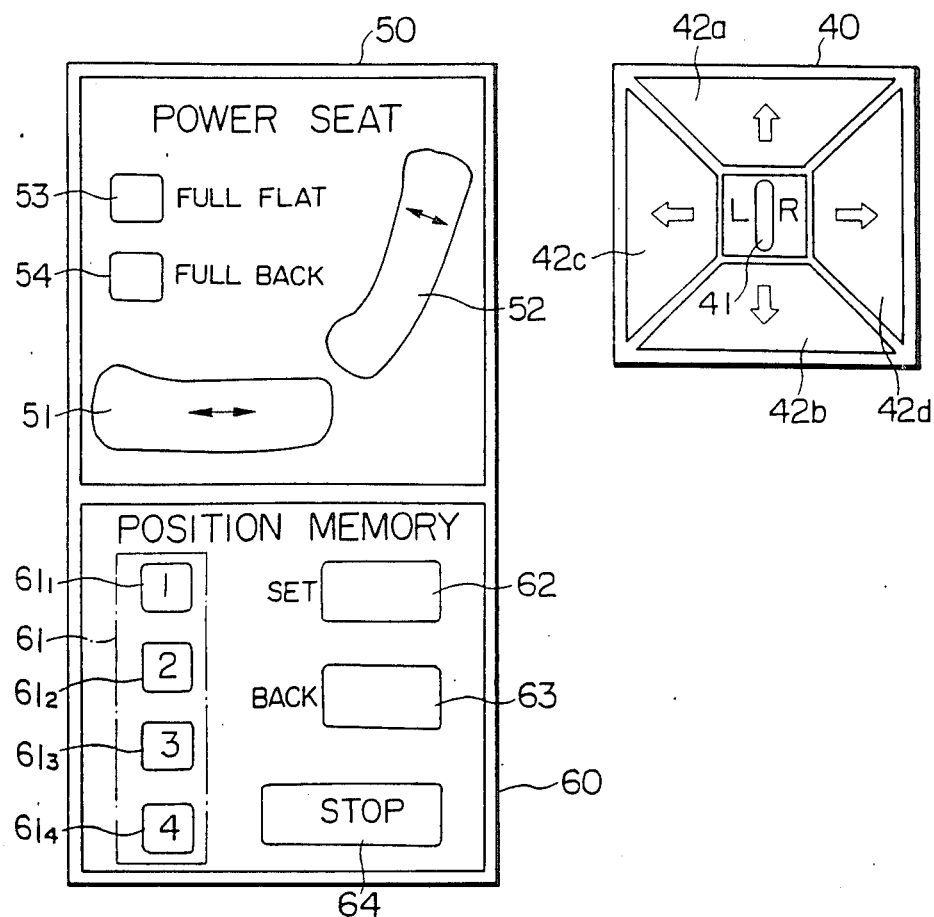
FIG. 7 is a layout showing one arrangement of switch buttons for operating the control system.

As shown in FIG. 7, on the other hand, the system activation console is composed of operating units 40 and 50 for operating the longitudinal seat position, the seat back angle and the mirror angle. Also, input keys are provided on an operation unit 60 for inputting command signals to the control unit 16. These are located near the driver's seat so that they can be easily operated by the driver.

The operation unit 40 is equipped at its center with a lever 41 which can be inclined to the right or left to select either the right or left side mirrors for adjustment and can take a neutral locked position in which the right and left mirrors are stopped so that they cannot be adjusted any more. Moreover, the lever 41 is equipped therearound with buttons 42a, 42b, 42c and 42d formed of four momentary switches, which can be suitably depressed to incline the mirrors vertically and transversely.

On the other hand, the operation unit 50 is arranged with a longitudinal adjusting button 51 for adjusting the driver's seat D and a reclining button 52 for adjusting the reclining angle of the seat back support B, and the two buttons 51 and 52 are made of momentary switches. Moreover, the driver's seat D is moved forward when the adjusting button 51 is depressed, whereas the seat back B is raised if the reclining button 52 is depressed. The operation unit 50 is further equipped with a full-flat button 53 and a full-back button 54 which are made of tact switches. The seat back B is shifted to a full-flat position, in which it is generally horizontal, when the full-flat button 53 is depressed. The driver's seat D is retracted to its rear most position, in which it is furthest from the handle H, if the full-back button 54 is depressed.

On the other hand, the operation unit 60 is equipped with the following switch buttons so as to input instructing and controlling signals to the control unit 16. Specifically, a switch button group 61 is composed of four identifying buttons $61_1$ to $61_4$, which are assigned for example to identify four drivers of the automobile, respectively. The data representing the preferred driving position of one of the drivers can be read out by depressing the corresponding button assigned to the individual out of the switch button group 61. The operation unit 60 is further equipped with: a set switch button 62 for storing the data concerning the preferred driving position of the respective drivers for ordinary forward driving in the memory unit 13; a back switch button 63 for storing the data of the respective drivers for driving in reverse; and a stop button 64 for stopping the operation of all adjustment means in an emergency.

Figure 8:
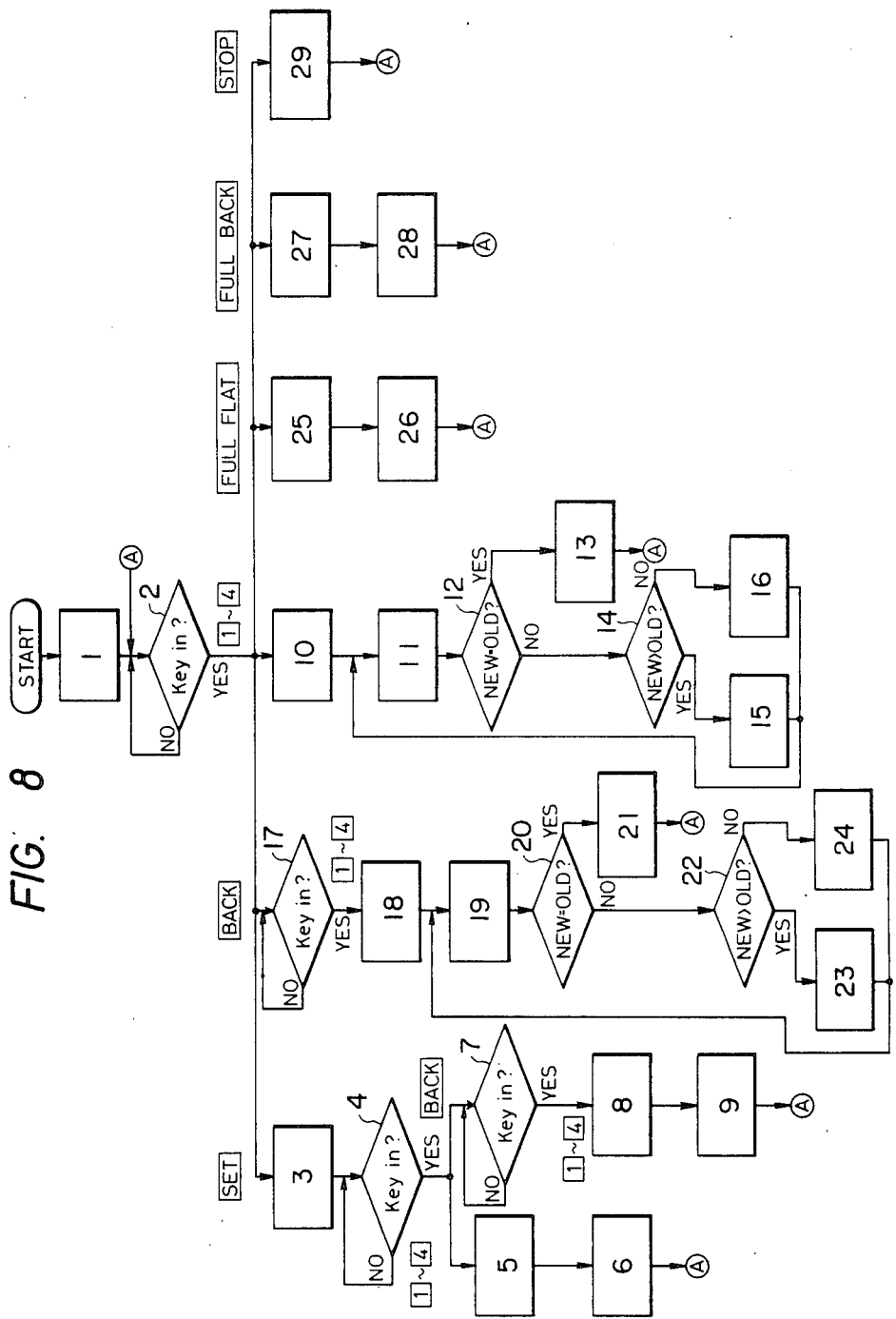
FIG. 8 is a flow chart illustrating the operations of the control unit.

Next, the operations concerning the controls of the driving position will be described with reference to FIG. 8.

First of all the control unit has a microcomputer. When the starter of the automobile is energized, initializations routines for the microcomputer (control unit) such as inhibition of interruption, settings of the full-back position and full-flat position, setting of a timer and so on are effected at a step 1, and a key-in state is continued (at a step 2), in which the system is caused to stand by and poll until any of the buttons of the operation unit 60 are depressed.

In order to write the data concerning the preferred driving position of the present driver, therefore, the set switch button 62 is first depressed. As a result, a memory write subroutine is entered (at a step 3), and the operation comes again into the key-in state of a step 4. If any one of the buttons $61_1$ to $61_4$, of the switch button group 61 is then depressed, the address of the present driver is set by the button depressed (at a step 5). In this state, the setting of the optimum driving position of that particular driver is conducted at a step 6. More specifically, data concerning the angle of the rear-view mirror M, the position of the driver's seat D and the angle of the seat back B, all of which have been previously adjusted by the user by operating the operation units 40 and 50, are detected by the detecting means 14, 15$_S$ and 15$_B$ as the optimum driving position and are stored in that individual user's memory area of the memory unit 13 according to the user's identification. Simultaneously the old data in that memory area is erased when new parameters are written into the memory unit 13.

Optimum driving positions of the respective drivers for the ordinary run (forward) and for driving in reverse are sequentially stored in the memory unit 13. The operations for automatically adjusting the angle of the rear-view mirror M, the position of the driver's seat, and the angle of the seat back B to the optimum driving positions of the respective drivers on the basis of this data stored in memory will be described in the following.

First of all, in order to adjust the driving position in the ordinary run for each driver, an identifying button from the switch button group 61 is assigned to each driver and when this button is depressed in the key-in state of the step 2 the memory address of that user is selected at a step 10, and the actual position data (ACT) concerning the actual angle of the rear-view mirror M, the actual position of the driver's seat D and the actual angle of inclination of the seat back B are read in at a step 11 from the detecting means 14, 15$_S$ and 15$_B$ and are sequentially compared at step 12 with the preferred optimum positions (OPT) concerning that particular driver which have been stored in the memory unit 13. If all the signals concerning the actual angle of the rear-view mirror M, the position of the driver's seat D and the reclining angle of the seat back B match the optimum position, that is, ACT=OPT, then the operations of the mirror angle adjusting means 11, the longitudinal seat position adjusting means 12$_S$ and the seat back angle adjusting means 12$_B$ are stopped at a step 13 by generating control signal #1 which brakes the motors. If on the other hand, there is an inequality such that ACT≠OPT for any of the signals indicating the angle of the rear-view mirror M, the position of the driver's seat D and the reclining angle of the seat back B, for example, then the processor performs a comparison to determine at a step 14 whether ACT<OPT. If YES, the corresponding position adjusting means (12$_S$, 12$_B$ and 11) is adjusted at a step 15 by generating a control signal #2 to move the corresponding body forward thus increasing the actual position, ACT. If NO, i.e., if ACT is found to be greater than OPT as a result of the aforementioned comparison at the step 14, the corresponding position adjusting means (12$_S$, 12$_B$ and 11) is adjusted at a step 16 by generating a control signal #3 to move the body being adjusted backward. Moreover, after the adjustment, the actual position is read again at the step 11, and this ACT data is compared with the OPT data. The control signal outputs #2 and #3 are repeated until the condition of ACT=OPT is reached. When this condition holds, the output #1 for stopping the operations of the position adjusting means is generated.

In order to make an adjustment for achieving the optimum driving position when driving in reverse on the other hand, the back switch button 63 is depressed in the key-in state of the step 2. As a result, the operation is caused to stand by again in the key-in state (at a step 17). If any switch button of the switch button group 61 is depressed, a user identifying address is set at a step 18 like in the ordinary run. Then, the detected data (ACT) is read out at a step 19 and sequentially compared at a step 20 with the optimum position data (OPT) concerning that particular driver. If the condition of ACT=OPT holds, the output #1 for stopping the adjusting means is generated at a step 21. If the comparison fails to satisfy the condition, i.e., reveals ACT≠OPT, on the other hand, the comparison for determining whether ACT<OPT is conducted (at a step 22). If YES, the output #2 for the same adjustment in one direction as aforementioned is generated. If NO, on the contrary, the output #3 for the adjustment in the inverse direction is generated at a step 24 to effect the adjustments by those respective adjustment means. These adjustments are sequentially continued until the data after the adjustments hold under the condition of ACT=OPT. When all the data satisfies the condition of ACT=OPT, the driving position optimum for that particular driver in the backward run is attained.

If, in the key-in state of the step 2, the full-flat button 53 of the operation unit 50 is depressed, on the other hand, an address is set at a step 25 to output an offset value (at a step 26) thereby to establish the full-flat state in which the driver's seat D is generally coextensive with the seat portion S and the seat back B. If the full-back button 54 is depressed, on the other hand, an address therefore is set at step 27 so that the driver's set D is moved (at a step 28) to its rearmost position remotest from the steering handle H in response to the offset output thereby to make it convenient for the driver to get into and out of the automobile. If the stop button 64 is depressed during the aforementioned adjusting operations in the ordinary run or in the backward run or during transfer to the full-flat or full-back position, moreover, an output zero is outputted (at a step 29) to stop the aforementioned respective operations.

Incidentally, in the preferred embodiment thus far described, the switch button group 61 is exemplified by the four buttons 61$_1$ to 64$_4$. Instead of this arrangement, the switch button group 61 may be constructed such that it allows a plurality of any number of drivers to take their optimum driving positions in accordance with their individual characteristics. Moreover, the specific constructions of the adjusting means for the rear-view mirror M and the driver's seat D should not be limited to the aforementioned ones but may be modified if they can automatically make the adjustments by the button operations at the driver's seat. Still, moreover, the adjustment of the driver's seat position may include the vertical position adjustment of the driver's seat in addition to the aforementioned longitudinal one.

As has been described in detail here, according to the present invention, in an automobile shared among a plurality of drivers, the driver's seat can be easily adjusted to an optimum position in accordance with the individual characteristics of the drivers so that the automobile can be driven smoothly and safely.

We claim:

1. A seating position control system comprising:
   a power seat having adjusting means responsive to a control signal from a control unit for adjusting the position of the seat, and detecting means for detecting the seating position of the seat and supplying a position signal to the control unit;
   a mirror having adjusting means responsive to a control signal from the control unit for adjusting the angle of the mirror, and detecting means for detecting the angle of the mirror and supplying an angle signal to the control unit;

memory means for storing a predetermined optimum position of the seat and angle of the mirror for a driver and supplying this optimum position and angle to the control unit; and activation means for activating the control unit to send a control signal to each of the seat adjusting means and the mirror adjusting means to thereby adjust the seating position of the seat together with the angle of the mirror to the optimum position and angle, respectively, based on the position signal supplied by the seat detecting means and the angle signal supplied by the mirror detecting means.

2. A seating position control system as in claim 1 wherein said memory means can store a plurality of optimum positions; and said control unit has means for addressing a desired subset of said plurality of optimum positions according to an identification code supplied by the activation means.

3. A seating position control system as set forth in claim 2 wherein said control unit has storing means for storing the detected seating position as a subset of said plurality of optimum positions stored in the memory unit.

4. A seating position control system as set forth in claim 2 wherein said activation means includes key means for generating said identification code.

5. A seating position control system as set forth in claim 1 wherein said control unit includes means for comparing the detected seat position with the optimum position and sending a first control signal to stop adjustment of the adjusting means when the detected position is equal to the optimum position.

6. A seating control system as set forth in claim 5 wherein said control unit has means for sending second and third control signals to said adjusting means based on an inequality detected by said means for comparing to thereby cause said adjusting means to adjust toward the optimum position.

7. A seating position control system as set forth in claim 1 wherein said seat adjusting means is provided to adjust the position of the seat in predetermined directions in response to control signals from the control unit, and said activation means includes corresponding operation keys for operating the control unit to energize the seat adjusting means in the respective predetermined directions.

8. A seating position control system comprising:

a power seat having adjusting means responsive to a control signal from a control unit for adjusting the position of the seat, and detecting means for detecting the seating position of the seat and supplying a position signal to the control unit, wherein said adjusting means includes a rotating member for shifting the position of the seat and said detecting means includes a rotary encoder means for detecting the rotation position of the rotating member of said adjusting means;

memory means for storing a predetermined optimum position of the seat for a driver and supplying this optimum position to the control unit; and activation means for activating the control unit to send a control signal to the seat adjusting means to thereby adjust the seating position of the seat together to the optimum position based on the position signal supplied by the seat detecting means.

* * * * *